United States Patent [19]

Klink

[11] Patent Number: 5,630,953
[45] Date of Patent: May 20, 1997

[54] METHOD OF FINE-MACHINING A WORKPIECE SURFACE TO BE SUPPLIED WITH A LUBRICANT DURING OPERATION OF THE WORKPIECE

[75] Inventor: Ulrich Klink, Neuffen, Germany

[73] Assignee: Maschinenfabrik Gehring GmbH & Co., Ostfildern, Germany

[21] Appl. No.: 242,285

[22] Filed: May 13, 1994

[30] Foreign Application Priority Data

May 13, 1993 [DE] Germany .................. 43 16 012.3

[51] Int. Cl.$^6$ .................. B23K 26/00; F16C 33/10
[52] U.S. Cl. .................. 219/121.69
[58] Field of Search .................. 219/121.72, 121.84, 219/121.68, 121.69; 83/53, 56, 177, 929; 451/36, 38, 54, 55; 384/13, 291, 292; 29/888.06, 888.061

[56] References Cited

U.S. PATENT DOCUMENTS

| | | | |
|---|---|---|---|
| 2,292,662 | 8/1942 | Sanders | 29/888.061 |
| 3,961,104 | 6/1976 | Tanner | 29/888.06 |
| 4,558,960 | 12/1985 | Lehtinen et al. | 384/292 |
| 4,576,488 | 3/1986 | Steiner et al. | 384/291 |
| 4,972,061 | 11/1990 | Duley et al. | 219/121.69 |
| 4,980,996 | 1/1991 | Klink et al. | 29/888.06 |
| 4,996,113 | 2/1991 | Hector et al. | 219/121.67 |
| 5,120,395 | 6/1992 | Monson et al. | 219/121.69 |
| 5,351,397 | 10/1994 | Angeli | 29/890.053 |
| 5,415,476 | 5/1995 | Onishi | 384/292 |
| 5,441,439 | 8/1995 | Grimm et al. | 451/54 |

FOREIGN PATENT DOCUMENTS

| | | | |
|---|---|---|---|
| 0565742 | 10/1993 | European Pat. Off. . | |
| 3510393 | 4/1986 | Germany . | |
| 3719796 | 12/1988 | Germany . | |
| 3932328 | 4/1991 | Germany . | |
| 58-179588 | 10/1983 | Japan | 219/121.69 |
| 1740735 | 6/1992 | U.S.S.R. | 29/888.061 |
| 1784078 | 12/1992 | U.S.S.R. | 384/291 |

Primary Examiner—Geoffrey S. Evans
Attorney, Agent, or Firm—Robert W. Becker & Associates

[57] ABSTRACT

The method of fine-machining a workpiece surface to be supplied with a lubricant during operation of the workpiece includes the steps of subjecting the workpiece surface to a stream of a medium to produce linearly extending channels of a predetermined first depth in the workpiece surface, the linearly extending channels defining areas therebetween, and forming in the areas by subjecting the workpiece surface to a stream of a medium grooves of a second depth smaller than the predetermined first depth. The linearly extending channels may be arranged in a crossed arrangement. Preferably, the method is carried out as a two-step process. Expediently the method further includes the step of employing a laser for at least one of the steps. The laser can form the channels with dimple shaped depressions positioned in a row.

26 Claims, 3 Drawing Sheets

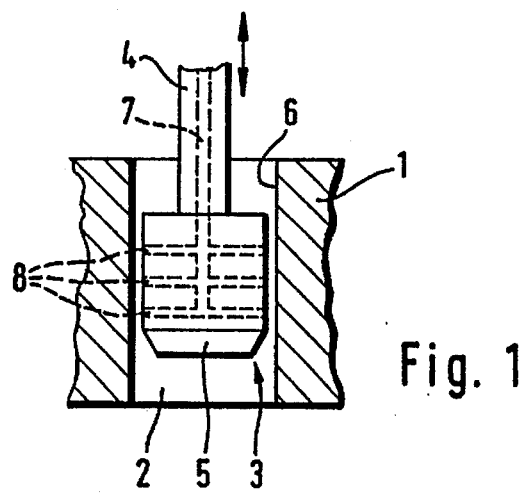
Fig. 1
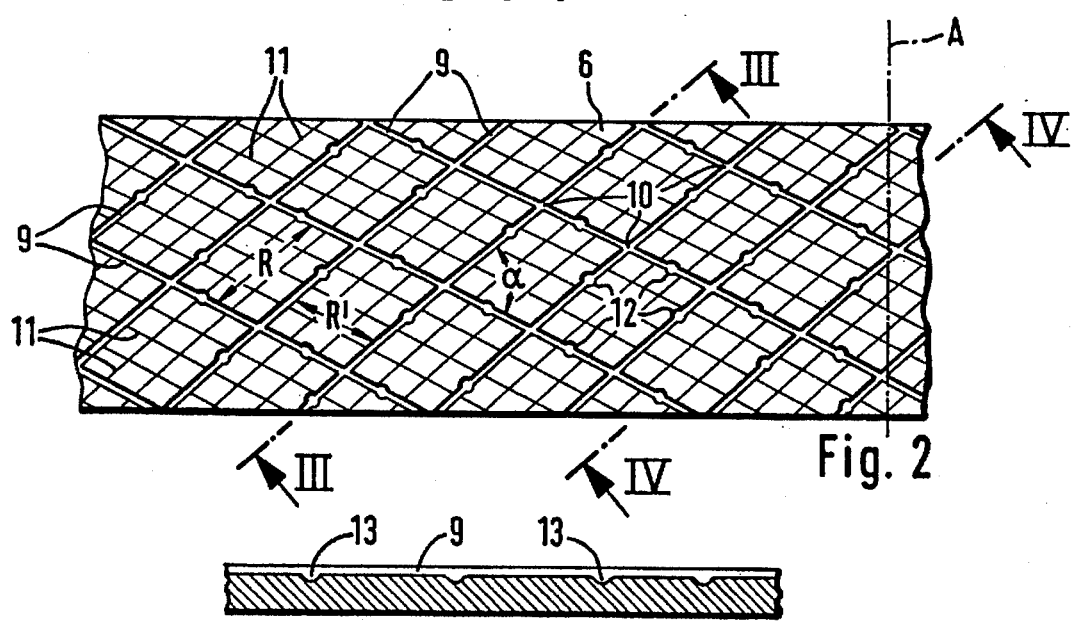
Fig. 2
Fig. 3
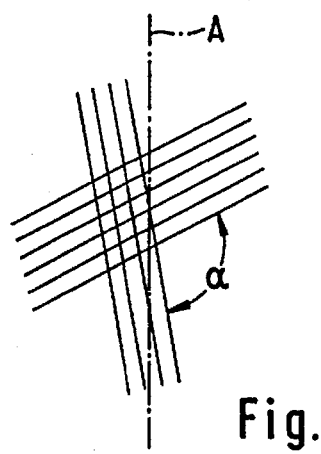
Fig. 5
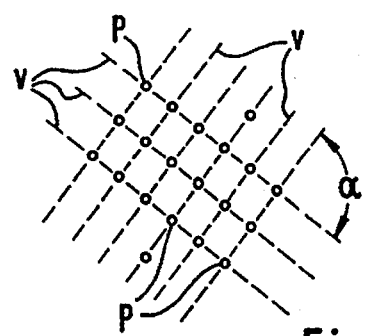
Fig. 6

METHOD OF FINE-MACHINING A WORKPIECE SURFACE TO BE SUPPLIED WITH A LUBRICANT DURING OPERATION OF THE WORKPIECE

BACKGROUND OF THE INVENTION

The present invention relates to a method for fine-machining of workpiece surfaces to be supplied with a lubricant during operation of the workpiece, especially for fine-machining of bore walls in cylinders of an internal combustion engine, whereby the workpiece surface is provided with linearly extending, especially crossed (intersecting), recesses.

For fine-machining of workpiece surfaces honing processes are known which are generally used in order to provide a bore wall, serving as the piston guide surface in a cylinder of an internal combustion engine, with the finished dimension. Conventionally, a plurality of honing operations are performed in order to reach the finished dimension. For the honing process honing stones are commonly used which are moved back and forth into the bore with axial stroke and simultaneous rotation about the bore axis whereby in the surface to be machined crossed (intersecting) honing traces are generated which during the later use of the workpiece that, for example, is comprised of cast-iron, provide a reservoir for the required lubricant. For reaching the finished dimension it is also possible to use a plateau honing process as a last method step in which with a very fine cutting tool only the peaks of the already honed surface are removed. With this process, the supporting guiding surface for the piston can be enlarged during finishing honing of the piston guide surface.

It is also known to use a last method step during fine-machining of bore surfaces in which the workpiece surface is subjected to a stream of a medium, whereby preferably laser beams are used (German Offenlegungsschrift 39 32 328). With the laser beam the peaks of the honed surface are removed primarily by vaporization whereby flakes and loosely attached particles are also removed. The honing traces remain intact with this method of machining.

For finishing the finish-honed bores it is furthermore known to remove flakes by brushing and/or high pressure jets and to expose thereby graphite lamellas of the cast iron material (German Offenlegungsschrift 37 19 796). In this method the honing traces also remain intact (they are required for the subsequent lubricant distribution over the entire honed surface).

The honing traces which result from the machining by honing with the honing stones are irregular with respect to width, depth, and distance corresponding to the material-based irregularities of the cutting surface of the honing tool. The profile of the honed surface therefore consists of a conglomerate of greater and smaller peaks and valleys which, in the case of plateau honing, also consists of flattened areas. Thus, in the mass production of engines considerable differences result in the operation of the individual engines.

For improving the lubricant distribution of the fine-machined surface it has been suggested, especially for piston guide surfaces in cylinders, to carry out a method step of subjecting, after the honing step resulting in only a slight roughing depth, the surface to a stream of material with which grooves of a greater depth can be generated according to a predetermined design whereby the step of subjecting to a stream of material is performed either with a laser beam or with a liquid stream under high pressure (European document 92 106 305). In this process grooves of a predetermined depth are produced according to a defined design, for example, with uniform crossings (intersections) whereby the material at the edge of the grooves is not deformed in any way, shape or form. The grooves thus provide a lubricant reservoir with a uniform distribution of the lubricant.

It is therefore an object of the present invention to provide a substantially precisely predetermined surface structure by a fine-machining step which surface structure can be adapted to the subsequent operational conditions of the workpiece in an optimal manner.

SUMMARY OF THE INVENTION

The method of fine-machining a workpiece surface to be supplied with a lubricant during operation of the workpiece according to the present invention is primarily characterized by the following steps:

Subjecting the workpiece surface to a stream of a medium to produce linearly extending channels of a predetermined first depth in the workpiece surface, the linearly extending channels defining areas therebetween; and Forming by subjecting the workpiece surface to a stream of a medium in said areas grooves of a second depth smaller than the predetermined first depth.

Preferably, the method further comprises the step of arranging the linearly extending channels in a crossed arrangement.

Advantageously, the method further includes the step of performing the step of subjecting to a stream of a medium and the step of forming as a two-step process.

Expediently, the step of subjecting to a stream of a medium is performed first and subsequently the step of forming is carried out.

Expediently, the method further includes the step of employing a laser for at least one of the steps of subjecting to a stream of a medium and the step of forming.

In a preferred embodiment of the present invention, the method further includes the step of employing a liquid jet device for at least one of the steps of subjecting to a stream of a medium and the step of forming.

Preferably, the method further comprises the steps of selecting a ratio of the first depth to the second depth to be between 10:1 and 1.5:1 and selecting a width of the channels to a width of the grooves to be between 20:1 and 2:1.

Advantageously, the method further includes the steps of placing the channels parallel to one another and positioning 3 to 12 of the grooves between two adjacent ones of the channels.

Expediently, the method further comprises the steps of providing the channel and the grooves with a substantially identical cross-sectional contour. Preferably, the channels and the grooves are substantially triangular in cross-section or substantially rectangular in cross-section. Preferably, neighboring ones of the grooves have a rounded or flattened transition into one another.

Advantageously, the channels and the grooves have a substantially rounded bottom.

In a preferred embodiment of the present invention, the method further includes the step of machining the workpiece surface to a desired finished dimension before performing the step of subjecting to a stream of a medium and the step of forming.

In another embodiment of the present invention the method further includes the step of brushing the workpiece surface after the step of subjecting to a stream of a medium the step of forming.

Pursuant to another embodiment of the present invention the method of fine-machining a workpiece surface to be supplied with a lubricant during operation of the workpiece includes the steps of:

Providing the workpiece surface with linearly extending recesses serving as lubricant reservoirs; and Dividing the workpiece surface into at least two sections in which the recesses are different.

Advantageously, the recesses have an orientation and differ in said at least two sections from one another in their orientation. In the alternative, the recesses have a depth and differ in said at least two sections from one another in their depth.

Advantageously, the method further comprises the step of arranging the recesses in a crossed (intersecting) arrangement at a crossing (intersecting) angle in at least one of the at least two sections. Preferably, the recesses in the at least two sections differ from one another in their crossing angle. Advantageously, in one of the at least two sections the recesses are arranged without a crossed arrangement.

Advantageously, the method further comprises the steps of subjecting the workpiece surface to a stream of a medium to produce the recesses in the form of linearly extending channels of a predetermined first depth in the workpiece surface, the linearly extending channels defining areas therebetween, and forming by subjecting to a stream of a medium in the areas recesses in the form of grooves at a second depth smaller than the predetermined first depth.

In another embodiment of the present invention for fine-machining a workpiece surface to be supplied with a lubricant during operation of the workpiece, the method comprises the following steps:

Providing the workpiece surface with linearly arranged recesses serving as lubricant reservoirs, and forming at least some of the linearly arranged recesses as dimple-shaped depression positioned in a row.

Advantageously, the linearly arranged recesses are positioned in a crossed arrangement at a crossing angle.

Preferably, the workpiece surface is a piston guide surface of a cylinder of an internal combustion engine, wherein the method includes the step of providing a wear-sensitive section of the piston guide surface adjacent to the cylinder head with a tighter arrangement of the dimple-shaped depressions than a section of the piston guide surface remote from the cylinder head and neighboring the wear-sensitive area.

Preferably, the crossing angle of the crossed arrangement is smaller in the wear-sensitive section than in other sections of the piston guide surface.

Expediently, the method further includes the step of providing an end section of a piston guide surface remote from the wear-sensitive section with linearly extending recesses extending parallel to a center axis of the piston guide surface.

Preferably, the method further comprising the steps of subjecting the workpiece surface to a stream of a medium to produce the linearly arranged recesses in the form of a dimple-shaped depressions in the workpiece surface, the linearly arranged recesses defining areas therebetween, and forming by subjecting to a stream of a medium in the areas linearly arranged recesses in the form of grooves.

The inventive method differs from the conventional honing processes in that the linearly arranged recesses that determine the entire surface structure of the workpiece is generated by subjecting the surface to a stream of a medium. This allows for an exact determination of the linear extension of the recesses. Preferably, the step of subjecting the surface to the stream of a medium is carried out with a laser, especially, a YAG laser, whereby a very precise control of the stream of the medium (laser beam) with respect to intensity and direction of movement as possible.

Even though it is known to treat the piston guide surface of cylinders of internal combustion engines with laser beams (German Patent 35 10 393), the known treatment serves to partially harden the guide surface for improving its wear resistance against abrasive and corrosive wear. The point or linear hardening with a laser does not result in a surface structure that corresponds to the surface structure after honing with respect to the distribution of a lubricant.

For the inventive treatment with a stream of a medium for generating the channels and grooves a two-stepped process is preferably provided whereby expediently in a first method step the channels and in a second method step the grooves are generated. Expediently, the treatment with a stream of a medium is carried out after the workpiece surface has been machined to the desired finished dimension. For these preliminary steps conventional methods can be used, for example, mechanical honing in one or more honing operations or frictional honing, whereby, however, the surface should have a very small roughing depth so that the surface structure is essentially determined by the following step of subjecting the surface to a stream of a medium. After completion of this method step, it may be advantageous to perform a further finishing step such as brushing in order to remove possibly still present loose material particles.

The inventive method is especially suitable for finish-machining the workpiece surface in two or more sections with different structures of the recesses. This method is especially important for piston guide surfaces in combustion engines. The piston guide surfaces are subjected over their length to partially different wear loads whereby especially the wear at the upper dead center is more intensive than in other areas. With the inventive method the workpiece surface can be designed intentionally according to the expected load on the workpiece so that in all sections a uniform and adequate surface-covering lubrication is ensured. For example, the area of the piston guide surface, which is adjacent to the cylinder head and which represents an especially wear-intensive area, can be provided with a tighter network of linearly arranged recesses than the other areas when machining the workpiece according to the present invention. The crossing angle within the wear-sensitive area may be smaller than in the other areas. Furthermore, the channels and/or grooves within the wear-sensitive area may have a greater depth than in other areas of the workpiece surface. This functional and optimal design is especially possible with the suggested treatment of subjecting to a stream of a medium which allows for a targeted working of certain areas whereby the orientation and depth of the channels and/or grooves can be exactly achieved according to the predetermined desired finished dimensions.

A treatment by subjecting to a stream of a medium has the special advantage that the surface which has been finished to the desired finished dimension is no longer subjected to a pressure load, as, for example, is the case for plateau honing. Possible deviations of the desired bore cross-section from the ideal circular shape, which are often unavoidable but usually very slight, cannot have the effect that the supporting portion of the surface over the length of the bore fluctuates.

Inventively, the linear recesses at least in portions of the workpiece surface can be provided in the form of dimple-shaped depressions which are arranged in rows whereby the inventively suggested step of subjecting to a stream of a medium is especially expedient. The dimple-shaped depressions include circular and point-shaped depressions as well as depressions of any suitable shape or contour.

BRIEF DESCRIPTION OF THE DRAWINGS

The objects and advantages of the present invention will appear more clearly from the following specification in conjunction with the accompanying drawings, in which:

FIG. 1 shows schematically a tool for a high pressure jet treatment positioned in a bore;

FIG. 2 shows a portion of a developed bore surface;

FIG. 3 shows a section along line III—III of FIG. 2;

FIG. 5 shows a schematic representation of crossing recesses relative to a partial developed surface according to FIG. 2;

FIG. 6 shows schematically the arrangement of dimple-shaped depressions in rows which correspond to the orientation of crossing linear recesses.

DESCRIPTION OF PREFERRED EMBODIMENTS

Figure 4A:
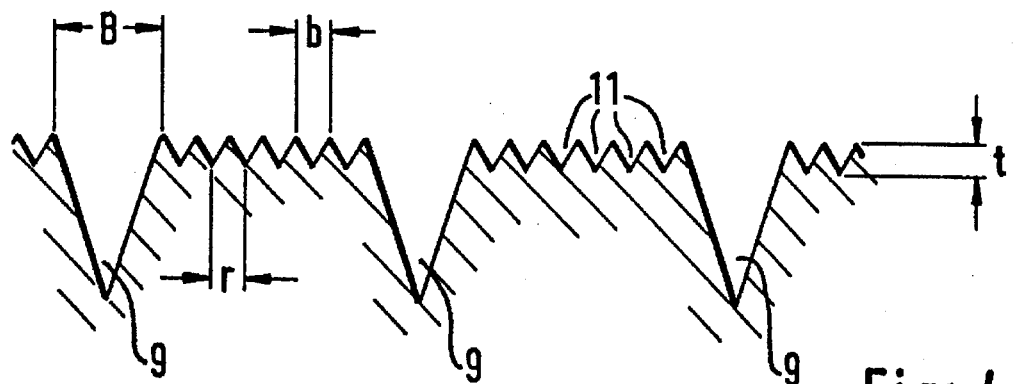
FIGS. 4a–4c show different profiles of channels and grooves in a schematic representation in a section along line IV—IV of FIG. 2.

The present invention will now be described in detail with the aid of several specific embodiments utilizing FIGS. 1 through 7.

FIG. 1 shows schematically a workpiece 1 with a bore 2 in axial section. Positioned in the bore is a device 3 for high pressure jetting which is comprised of a clamping rod 4 and a jet head 5. The clamping rod 4 is penetrated by a bore 7 which serves to supply a pressure medium to the jet head 5 and which opens into radially extending jets 8 within the jet head 5. From the jets 8 the liquid jets can exit in the direction towards the bore wall 6. The high pressure jet device 3 is driven in the direction of the double arrow with axial strokes and furthermore rotated about its longitudinal axis which coincides with the axis of the bore. Due to the combined stroke and rotational movement of the device, the liquid jets generate in the bore wall 6, i.e., in the workpiece surface to be machined, spirally extending and crossing recesses, similar to those that are generated by the honing stones of a honing tool. For the preferred invention treatment with laser beams a laser device is used, especially a YAG laser. The laser device is comprised of a laser unit that generates the laser beam and a beam head for adjusting the laser beam. The laser unit may be fixedly connected to the machine spindle. The machine spindle is a hollow spindle so that the laser beam can travel through the spindle and act on the optical device within the laser head which is fixedly connected to the spindle and which performs within the bore a defined stroke and rotational movement. The laser head may also be provided with a rotatable optical device so that it is only necessary to introduce the laser head in the axial direction into the bore with the rotation of the optical device being controlled. The axial movement can be performed in a plurality of strokes. For special machining operations, in which sections of the workpiece surface that are adjacent to one another in the axial direction and are to be machined differently, the high pressure jet device or the laser head of the laser are moved in a stepwise manner to the different heights of the bore and are rotated only after reaching the desired height. It is also possible to use individual optical units or a multi-functional optical unit within the laser head.

The step of subjecting the workpiece to a stream of a medium is preferably performed after the workpiece has been machined to the desired finished dimension of the bore. The surface to be treated may be machined to the desired finished dimension after roughing by rolling or calibrating. It is also possible to use a conventional honing operation with one or more honing steps or frictional honing whereby the surface is to be provided with a very low roughing depth Rz which should be, for example, 2 to 5 µm. It is also possible to use a combination of these methods to achieve the finished dimension of the bore.

In the subsequently performed method of subjecting to a stream of a medium, the channels are first produced in a certain design to provide a lubricant reservoir whereby the remaining areas form the supporting portion of the surface, i.e., in the case of a piston guide surface the gliding surface for the piston. The size of this supporting portion is to be selected as a function of the operational conditions of the future use of the workpiece.

FIG. 2 shows schematically in a developed projection a portion of the bore wall 6 which is provided with channels 9 as a lubricant reservoir produced by a laser beam. The bore axis A is indicated in a dash-dotted line. The crossing angle α of the channels 9 in the shown embodiment is 70°, but it may be greater or substantially smaller. At the intersections 10 the crossing channels 9 communicate. Since with the inventively suggested step of subjecting a workpiece surface to a stream of a medium, especially with a contact-free treatment with a laser, the edges of the channels have no projections of workpiece material, flattened portions, or flakes, the intersections 10 are entirely unobstructed so that an optimal distribution of the lubricant within the channels forming the reservoir is provided.

In the next method step the surface 6 is provided with grooves 11 that have a substantially smaller depth than the channels 9. For this method step the same device of subjecting the workpiece surface to a stream of a medium may be used as for the first method step. This device must then be controllable with respect to focusing of the stream of a medium. It is, however, also possible to use a second device for which purpose a second working station must be provided at the machine tool or the device must be exchanged within the same working station. It is also possible to perform one of the method steps with high pressure jets and the other method step with a laser beam.

As can be seen from FIGS. 2 and 3, the channels 9 may be provided with widened portions 12 and/or depressions 13 at a plurality of locations whereby the depressions 13 may also be located at the locations of the widened portions 12. The distribution of the widened portions and of the depressions over the length of the channels can be selected such that for each millimeter of length one depression/widened portion or up to 10 depressions/widened portions are provided (in FIG. 3 this is not represented true to scale). The channels for a width of approximately 10 µm to 100 µm can be widened at the locations 12 to approximately 30 µm to 300 µm and the depressions can have a depth of approximately 25 µm to 50 µm for a depth of the channels of approximately 5 µm to 20 µm.

Figure 4B:
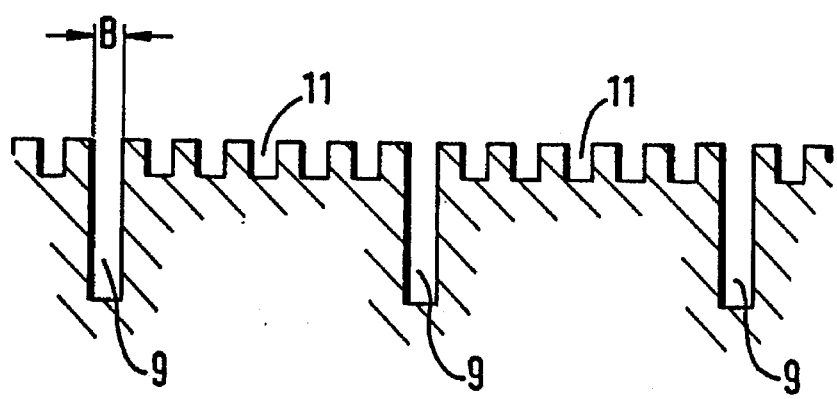
Figure 4C:
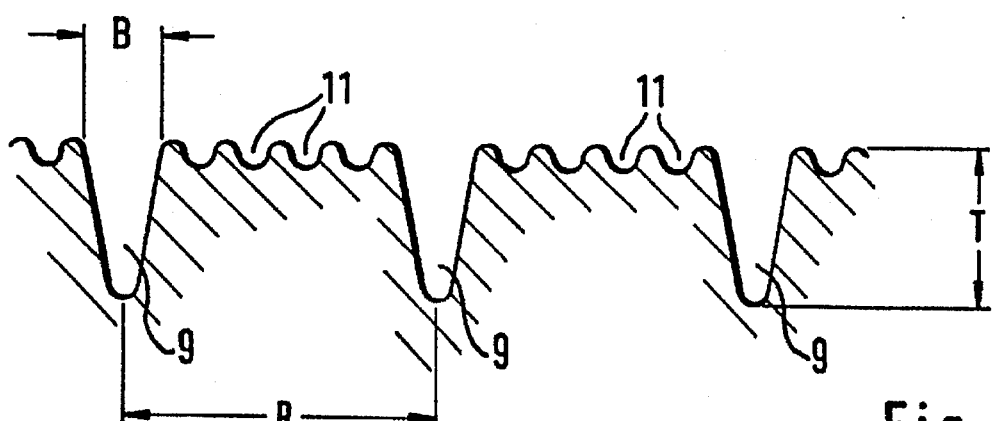

FIGS. 4a, 4b and 4c show different embodiments of the surface structure along the section line IV—IV of FIG. 2.

According to FIG. 4a the channels 9 and the grooves 11 in cross-section have approximately a triangular shape. The cross-section of the channels and the grooves according to 4b is substantially rectangular so that in cross-section a meander-like structure results. In the embodiment according to FIG. 4c the contour is substantially comb-shaped with rounded corners whereby the grooves 11 between two channels 9 extend substantially wave-shaped, and the channels at the transition into the grooves 11 as well as their bottoms are rounded. Since the inventive method is preferably performed in two steps of subjecting the workpiece surface to a stream of a medium, it is also possible to select for the channels a different cross-sectional shape than for the grooves.

The width B of the channels 9 may be between 10 μm and 100 μm, while its depth T may be approximately 3 μm to 20 μm. For such dimensions, the width B for the grooves 11 is selected to be between 5 μm and 40 μm and their depth T is selected to be between 2 μm and 10 μm.

The distance R, respectively, R' indicated in FIGS. 2 and 4c between channels 9, that extend into the same direction and are adjacent to one another, should be between 0.1 mm and 1 mm whereby the distances R and R' can be identical or, as shown in FIG. 2, different. For very short distances R, respectively, R' it may be expedient to move the device for subjecting the workpiece surface to a stream of a medium in a plurality of strokes within the bore 2. When using a laser, it is also possible to use for the generation of small distances a plurality of deflecting mirrors or a multi-functional optical device. For the device of subjecting the workpiece surface to a stream of a medium a non-represented control is provided with which the distances R and R' between the channels may be adjusted.

The treatment by subjecting the workpiece surface to a stream of a medium allows to select the crossing angle α to be unsymmetric to the bore axis A as is shown in the embodiment of FIG. 5 in a schematic illustration. This is in contrast to conventional honing. This unsymmetric position can be selected for the channels and the grooves. Thus, it is also possible to select a combination in which the crossing angle α for the channels has a different position and/or size than that of the grooves.

FIG. 6 shows a special embodiment for the design of the recesses that form the lubricant reservoir. The linear extension v of the recesses is indicated in a dashed line. This extension is formed by rows of dimple-shaped depressions whereby the individual dimple-shaped depressions P form crossing rows. These individual depressions P of the small surface area may have any desired shape. For a circular contour of the depressions their diameter, for example, is between approximately 10 μm and 200 μm. The depth of the individual depressions may be approximately 2 μm to 30 μm and their distance can be up to 1 mm. The sequentially arranged individual depressions P of each row may be provided instead of a channel 9. The angle α between crossing rows of depressions can be selected freely corresponding to the desired crossing angle α of the channels 9. In addition to the depressions arranged in rows, it is also possible to provide the surface of a workpiece with grooves 11 as described above. For generating the individual depressions P of a small surface area a laser is especially suitable.

Figure 7:
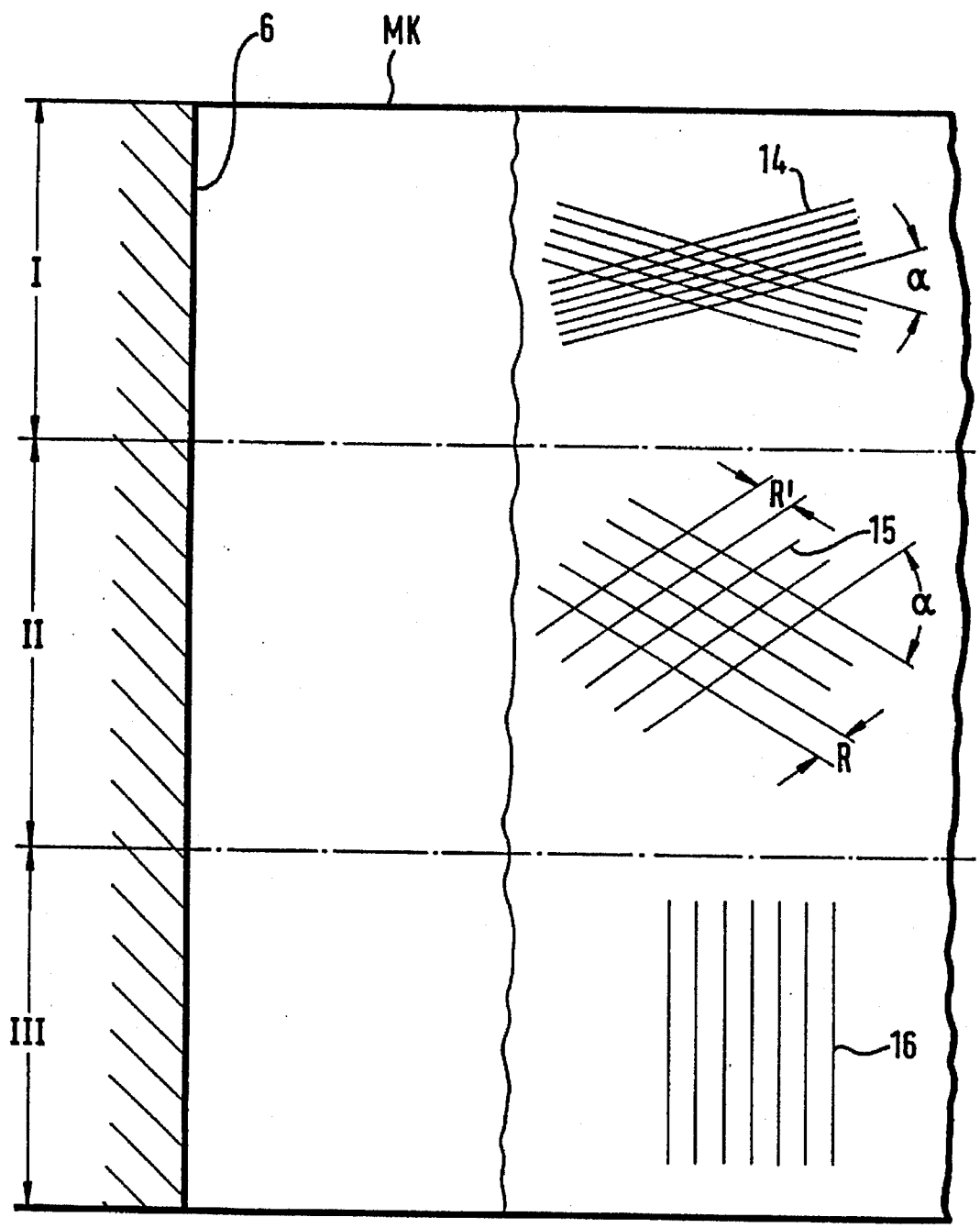
FIG. 7 shows schematically in partial section a piston guide surface which in three areas has differently arranged linear recesses as illustrated in the right half of the drawing.

FIG. 7 shows schematically a division of the bore wall 6 into different sections I, II, and III. In the three sections recesses 14, 15, and 16 recesses of different structure are generated for which purpose a high pressure jet or laser is suitable.

The division into different section with different surface structure is primarily designed for piston guide surfaces and cylinders of internal combustion engines. The piston guide surface is subjected to different loads over its entire length. In the section I, which is adjacent to the cylinder head and which corresponds to the upper dead center of the piston, the wear is especially intensive. In this area during operation a large amount of lubricant should be provided and uniformly distributed over the entire surface area whereby a sufficiently large portion of supporting surface with respect to the entire surface must be provided. It is therefore suggested to arrange the linearly extending recesses 14 in the section I with relatively small crossing angles α which should for example be 5° to 30°. The recesses 15 in the section II have a greater distance R and R' and also a greater crossing angle which is in the range of crossing angles of conventional honing traces, i.e., approximately 30° to 60°. This section of the piston guide surface, respectively, of the workpiece surface 6 is thus adapted with respect to its lubrication to a medium wear load.

The section III at the lower end of the bore is subjected to a lesser load. It is therefore sufficient to provide only parallel recesses 16 which extend substantially in the direction of the axis of the bore and which primarily facilitate the return of the lubricant.

The piston guide surface 6 may also be divided into only two or in more than three sections, for example, up to six sections with different surface structures. Especially when using the inventively suggested method of subjecting the workpiece surface to a stream of a medium, an exact border between the individual sections can be provided.

The linearly extending recesses 14, 15, and 16 can be manufactured in the described manner as channels and it is possible to generate therebetween the grooves 11 as shown in FIGS. 2 and 4a to 4c. The crossing angle α can be positioned unsymmetrically to the axis of the bore (see FIG. 5), and instead of the linearly extending recesses dimple-shaped depressions can be provided as shown in FIG. 6.

The present invention is, of course, in no way restricted to the specific disclosure of the specification and drawings, but also encompasses any modifications within the scope of the appended claims.

What I claim is:

1. A method of fine-machining a workpiece surface to be supplied with a lubricant during operation of the workpiece, said method comprising the steps of:

subjecting the workpiece surface to a laser beam to produce linearly extending channels of a predetermined first depth in the workpiece surface, the linearly extending channels defining areas therebetween; and forming in said areas by subjecting the workpiece surface to a laser beam grooves of a second depth smaller than said predetermined first depth.

2. A method according to claim 1, further comprising the step of arranging said linearly extending channels in a crossed arrangement.

3. A method according to claim 1, including the step of performing said step of subjecting to a laser beam and said step of forming as a two-step process.

4. A method according to claim 3, wherein said step of subjecting to a laser beam is performed first and subsequently said step of forming is carried out.

5. A method according to claim 1, further including the step of machining the workpiece surface to a desired finished dimension before performing said step of subjecting to a laser beam and said step of forming.

6. A method according to claim 1, further including the step of brushing the workpiece surface after the step of subjecting to a laser beam and the step of forming.

7. A method according to claim 1, further comprising the steps of:
   selecting a ratio of said first depth to said second depth to be between 10:1 and 1.5:1; and
   selecting a width of said channels to a width of said grooves to be between 20:1 and 2:1.

8. A method according to claim 1, further including the steps of:
   placing said channels parallel to one another; and
   positioning 3 to 12 of said grooves between two adjacent ones of said channels.

9. A method according to claim 1, further comprising the step of providing said channels and said grooves with a substantially identical cross-sectional contour.

10. A method according to claim 9, wherein said channels and said grooves are substantially triangular in cross-section.

11. A method according to claim 9, wherein said channels and said grooves are substantially rectangular in cross-section.

12. A method according to claim 9, wherein neighboring ones of said grooves have a rounded transition into one another.

13. A method according to claim 9, wherein neighboring ones of said grooves have a flattened transition into one another.

14. A method according to claim 9, wherein said channels and said grooves have a substantially rounded bottom.

15. A method according to claim 1, comprising the step of:
   forming with the laser beam at least some of said linearly extending channels as dimple-shaped depressions positioned in a row.

16. A method according to claim 15, wherein said linearly extending channels are positioned in a crossed arrangement at a crossing angle.

17. A method according to claim 16, wherein the workpiece surface is a piston guide surface of a cylinder of an internal combustion engine, including the step of providing a wear-sensitive section of said piston guide surface adjacent to the cylinder head with a tighter arrangement of said dimple-shaped depressions than a section of said piston guide surface remote from the cylinder head and neighboring said wear-sensitive area.

18. A method according to claim 17, wherein said crossing angle of said crossed arrangement is smaller in said wear-sensitive section than in other sections of said piston guide surface.

19. A method according to claim 18, further including the step of providing an end section of said piston guide surface remote from said wear-sensitive area with linearly extending recesses extending parallel to a center axis of the piston guide surface.

20. A method of fine-machining a workpiece surface to be supplied with a lubricant during operation of the workpiece, said method comprising the steps of:
   providing with a laser beam the workpiece surface with linearly extending recesses serving as a lubricant reservoir; and
   dividing the workpiece surface into at least two sections in which sections said recesses are different.

21. A method according to claim 20, wherein said recesses have an orientation and differ in said at least two sections from one another in said orientation.

22. A method according to claim 20, wherein said recesses has a depth and differ in said at least two sections from one another in said depth.

23. A method according to claim 20, further comprising the step of arranging said recesses in a crossed arrangement at a crossing angle in at least one of said at least two sections.

24. A method according to claim 23, wherein said recesses in said at least two sections differ from one another in said crossing angle.

25. A method according to claim 23, wherein in one of said at least two sections said recesses are arranged free of said crossed arrangement.

26. A method according to claim 20, further comprising the steps of:
   producing said recesses in the form of linearly extending channels of a predetermined first depth in the workpiece surface, the linearly extending channels defining areas therebetween; and
   forming in said areas said recesses in the form of grooves of a second depth smaller than said predetermined first depth.

* * * * *